(12) United States Patent
Nolan et al.

(10) Patent No.: US 9,613,433 B2
(45) Date of Patent: Apr. 4, 2017

(54) METHOD OF CHARACTERIZING A LIGHT SOURCE AND A MOBILE DEVICE

(71) Applicant: PHILIPS DEUTSCHLAND GMBH, Hamburg (DE)

(72) Inventors: Julian Charles Nolan, Pully (CH); Alexander Henricus Waltherus Van Eeuwijk, Eindhoven (NL); Hilbrand Vanden Wyngaert, Eindhoven (NL); Heiko Pelzer, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/782,909

(22) PCT Filed: Apr. 7, 2014

(86) PCT No.: PCT/EP2014/056902
§ 371 (c)(1),
(2) Date: Oct. 7, 2015

(87) PCT Pub. No.: WO2014/170154
PCT Pub. Date: Oct. 23, 2014

(65) Prior Publication Data
US 2016/0042531 A1    Feb. 11, 2016

(30) Foreign Application Priority Data

Apr. 15, 2013    (EP) ..................... 13163673

(51) Int. Cl.
*G06T 7/40* (2006.01)
*H04N 5/247* (2006.01)
(Continued)

(52) U.S. Cl.
CPC ............... *G06T 7/408* (2013.01); *G06T 7/60* (2013.01); *H04N 5/23229* (2013.01);
(Continued)

(58) Field of Classification Search
CPC .......... G06T 7/408; G06T 2207/10004; H04N 5/23229; H04N 5/247; H04N 7/60
(Continued)

(56) References Cited

U.S. PATENT DOCUMENTS

2008/0106636 A1    5/2008   Wernersson
2008/0180553 A1    7/2008   Hassan-Shafique
(Continued)

FOREIGN PATENT DOCUMENTS

CN    102104735 A    6/2011
GB    2453163 A    4/2009
(Continued)

OTHER PUBLICATIONS

Hiscocks, P.D. "Measuring Luminance with a Digital Camera", Syscomp Electronic Design Limited, 2013.
(Continued)

*Primary Examiner* — Hee-Yong Kim

(57) ABSTRACT

A method of and a device for characterizing a light source and a method of selecting a replacement light source are provided. The method obtains (102) a first image of a light source in operation, obtains (106) a second image of the illuminated environment, and obtains (104, 108) first camera settings and second camera settings of the optical system and image processing system of the respective first and second camera at the respective moments in time that the first image and the second image was obtained. The first image, the second image, and the first and second camera settings are analyzed (110) to estimate characteristics of the light source. The characteristics of the light source may be used to propose a replacement light source and characteristics of the proposed replacement light source may be used to simulate the effect of the replacement light source on the illuminated environment.

15 Claims, 7 Drawing Sheets

(51) Int. Cl.
*G06T 7/60* (2006.01)
*H04N 5/232* (2006.01)
*H05B 37/02* (2006.01)
*H05B 37/00* (2006.01)
*H05B 37/03* (2006.01)
*H05B 37/04* (2006.01)

(52) U.S. Cl.
CPC ........... *H04N 5/247* (2013.01); *H05B 37/036* (2013.01); *H05B 37/04* (2013.01); *G06T 2207/10004* (2013.01)

(58) Field of Classification Search
USPC ........................................................ 348/135
See application file for complete search history.

(56) References Cited

U.S. PATENT DOCUMENTS

| | | | |
|---|---|---|---|
| 2010/0141809 A1 | 6/2010 | Fukutomi | |
| 2011/0133655 A1* | 6/2011 | Recker | H02J 9/02 315/159 |
| 2012/0057755 A1 | 3/2012 | Berkvens | |

FOREIGN PATENT DOCUMENTS

| | | |
|---|---|---|
| JP | 0745370 A | 2/1995 |
| JP | 09312198 A | 12/1997 |
| JP | 2005135834 A | 5/2005 |
| JP | 2011526414 A | 10/2011 |
| WO | 2008001259 A2 | 1/2008 |
| WO | 2011083394 A1 | 7/2011 |
| WO | 2012024163 A2 | 2/2012 |
| WO | 2012030815 A2 | 3/2012 |
| WO | 2012085742 A1 | 6/2012 |

OTHER PUBLICATIONS

Shailesh, K.R. et al "Application of RELUX Software in Simulation and Analysis of Energy Efficient Lighting Scheme", International Journal of Conputer Applications, vol. 9, No. 7, Nov. 2010.
Bhavani R.G. et al "Advanced Lighting Simulation Tools for Daylight Purposes: Powerful Features and Related Issues", Trends in Applied Sciences Research, vol. 6, Issue 4, 2011.

* cited by examiner

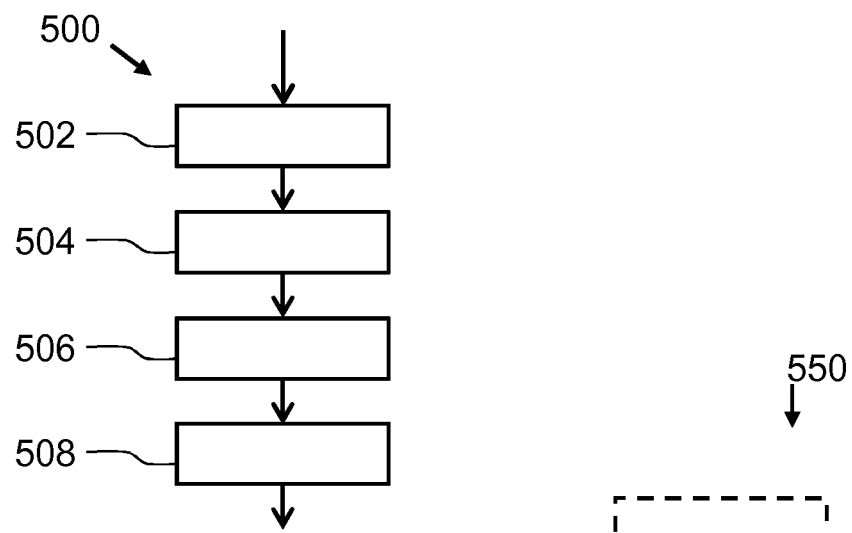
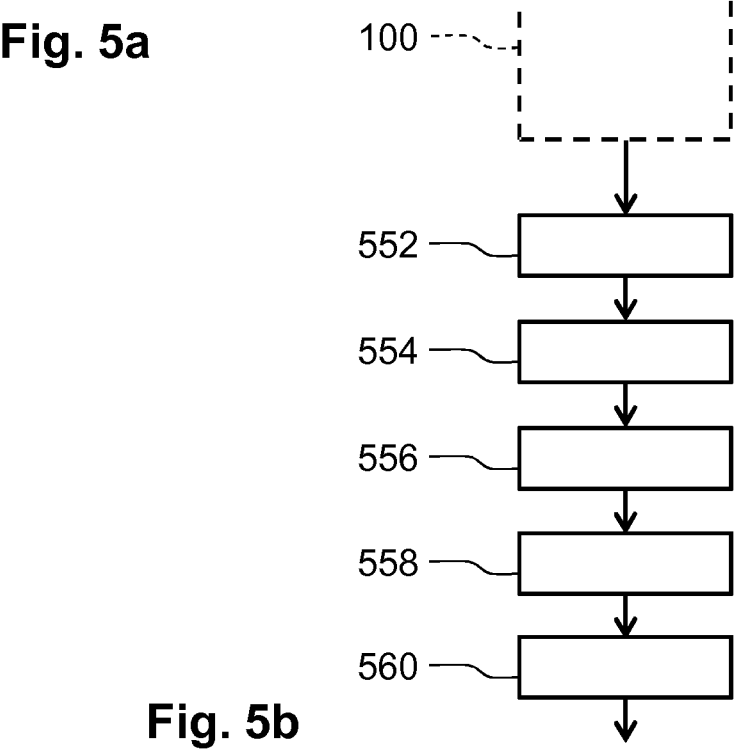
Fig. 5a
Fig. 5b

METHOD OF CHARACTERIZING A LIGHT SOURCE AND A MOBILE DEVICE

CROSS-REFERENCE TO PRIOR APPLICATIONS

This application is the U.S. National Phase application under 35 U.S.C. §371 of International Application No. PCT/EP2014/056902, filed on Apr. 7, 2014, which claims the benefit of European Patent Application No. 13163673.0, filed on Apr. 15, 2013. These applications are hereby incorporated by reference herein.

FIELD OF THE INVENTION

The invention relates to methods and device which are capable of characterizing a light source based on images obtained by a camera.

BACKGROUND OF THE INVENTION

It is required to know which type of light source is used in a lighting system in particular applications. For example, when lamps have to be replaced with more energy-friendly lamps, one would like to replace existing light source with light sources that have about the same light emission characteristics and, thus, knowledge about the currently installed light sources and light emitters is required. In other applications, a lighting system controls the light source such that a specific, predefined, illumination pattern is obtained in the illuminated environment. A controller of such a lighting system has to have some knowledge about the characteristics of the light source such that it is able to predict how the light source must be controlled to obtain the specific predefined illumination pattern.

In a first solution the characteristics of the installed light sources are manually provided to the controller of the lighting system. Every moment in time that a light source is replaced, new light source characteristics must be provided to the controller. In a second solution, a light source is controlled in the operational mode and an image is taken of the illuminated environment to detect what the influence of the light source is on the environment and, possibly, to derive light source characteristics from the image. Although the second solution may be performed automatically and may even be performed every time that the lighting system is switched on, it has specific disadvantages: reflected light is used to characterize the light sources and, as such, the environment influences the determination of the characteristics of the light source. For example, when the whole environment has a relatively dark color, the light intensity emitted by the light source will be underestimated.

Published patent application WO2008/001259 discloses a method of controlling a lighting system based on a target light distribution. Influence data is obtained for the light sources of the lighting system with a camera. The influence data comprises information in relation to a specific light source of the lighting system and shows how the illuminated environment is influenced by the operation of a specific light source. When the lighting system has to be controlled according to a target light distribution, the influence data is used to estimate how the light sources must be controlled to obtain an illuminated environment according to the target light distribution.

Patent application GB2453163A discloses a system for determining a three-dimensional representation of an object or scene. The system provides one or more light sources and comprises one or more two-dimensional image capture devices. In order to be able to determine the three-dimensional representation of the object or scene, characteristics of the light source must be known. Light reflected by the object or scene, as captured by the image capture devices, is used to estimate the characteristics. As discussed previously, using reflected light does not necessary lead to an accurate estimation of the light source characteristics.

SUMMARY OF THE INVENTION

It is an object of the invention to provide a method of characterizing a light source that more accurately estimates characteristics of the light source.

An aspect of the invention provides a method of characterizing a light source. A further aspect of the invention provides a method of selecting a replacement light source. Another aspect of the invention provides a device for characterizing a light source. Advantageous embodiments are defined in the dependent claims.

A method of characterizing a light source in accordance with the first aspect of the invention comprises the stages of i) obtaining a first image of the light source in operation by means of a first camera, the first image is obtained from a first position (P1) in a first direction (210), ii) obtaining first camera settings, iii) obtaining a second image of an illuminated environment being illuminated by the light source by means of a second camera, the second image is obtained from a second position (P2) in a second direction (214, 212) different from the first direction (210), iv) obtaining second camera settings, wherein the second camera settings represent parameters of an image processing system and of an optical system of the second camera used at the moment in time when the second image was obtained, and iv) analyzing the first image and analyzing the first camera settings to estimate first parameters of the light source. The light source comprises a light emitter for emitting light. The first camera settings represent the parameters of an image processing system and of an optical system of the first camera used at the moment in time when the first image was obtained. The first parameters of the light source may relate to characteristics of light emitted by the light emitter. In the stage of analyzing the first image and analyzing the first camera settings, second image and the second camera settings are also analyzed to estimate second parameters of the light source and to more accurately estimate the first parameters of the light source, wherein the second parameters of the light source relate to characteristics of a light beam emitted by the light source. The second parameters comprise information relating to a shape of the light beam.

The method according to the first aspect of the invention uses the first image, which directly images the light source in operation, as the basis for characterizing the first parameters of the light source. By obtaining the first image, it is prevented that other objects or surfaces influence the light that is recorded in the first image such that the first image comprises reliable data about the light source.

Not all characteristics of the light source can be accurately estimated on basis of the first image only. For example, one is not able to see on the first image whether the light beam emitted by the light source is narrow or wide. This information is present in the illuminated environment, because in the illuminated environment the footprint of the light beam is visible on surfaces of the illuminated environment and this footprint can be translated into information that relates to the shape of the light beam such as, is the light beam narrow or wide, is the light beam circular shaped or rectangular shaped, etc. Thus, by obtaining a second image much more and more reliable information about the light source can be obtained. The information about the first position, the first direction, the second position and the second direction is also taken into account in order to be able to translate information in the illuminated environment into information that relates to the light beam emitted by the light source. For example, perspective changes the shape of the footprint of the light beam and when the first position, second position and the first and second direction are known, the imaged shape of the footprint of the light beam can be transformed with perspective correction techniques into the actual shape of the light beam.

Thus, the obtaining of the first image and the second image, together with obtaining the first camera settings and obtaining the second camera settings, and by analyzing the information of these images and using the values of the settings, the method is capable of accurately estimating parameters of the light source because more information is available.

Each image that is taken by a camera is up to a certain level influenced by the camera settings. When analogue images are taken, for example, shutter speed, aperture size, focal distance and film characteristics (ISO, type of film) determine how the light source is imaged. When digital images are taken, for example, shutter speed, aperture size, focal distance are still important camera settings that influence the imaging of the light source in the first image. In digital imaging also additional image processing steps may be applied which influence the obtained first image. Examples of such additional image processing steps are processing the raw data from the image sensor in accordance with a specific ISO value, changing brightness and contrast and applying color corrections, etc. When the camera settings are known it is possible to deduct from the first image characteristics of the light that has been received from the light source. For example, the shutter speed, aperture size and ISO value may be used to calculate the light flux that had been received from a specific portion of the light source. The color of a specific portion of the first image, together with possible color corrections (or film characteristics) provide information about the color, color point, or color distribution that had been emitted by the light source.

The terms light source and light transmitter are used to distinguish the actual component that emits the light from the whole package around this light emitter. The light emitter is, for example, a light bulb, a light tube, a LED, etc. The whole package around the light emitter may comprise reflectors, optical elements, and/or other components of a luminaire which influence the light emission.

It is to be noted that an image sensor of the first camera is comprised in the image processing system of the first camera.

Optionally, the first parameters may also relate to geometrical parameters of the light source. The first image itself may provide additional information of the light source, such as size or shape of the light source.

Optionally, the second camera is the first camera and the method further comprises the stage of repositioning the first camera after obtaining the first image to the second position and redirecting the first camera in the second direction for obtaining the second image. This optional embodiment may save hardware. When only one camera is available, still two images can be made and only the repositioning and redirection is required as additional actions.

Optionally, the second position is substantially identical to the first position and the second direction is substantially opposite to the first direction. When a device is used which has at two opposite surfaces of the device a camera, this single device can be used to obtain the first image and the second image. Different types of mobile phones and tablet computers have two cameras at opposite sides and are, therefore, useful devices for executing the method according to the invention. The user has to position the device at the first position and direct one camera towards the light source in operation. Subsequently the device itself may automatically detect that it is directed towards a light source and may automatically obtain the first image and the second image, or the user provides a command to the device to obtain the first image and the second image. There is an additional advantage to obtain the first image and the second image from about the same locations and in opposite directions, because it makes the determination of light beam parameters easier, for example, the footprint of the light beam that is imaged in the second image is not altered because of the effect of different perspectives in the different images.

In a preferred embodiment of the above discussed optional embodiment, the first and second position is within the light beam emitted by the light source.

Optionally, characteristics of light emitted by the light emitter comprise at least one of: emitted light intensity by the light source, light emission spectrum of the light source, color point of the emitted light, color temperature of the emitted light. Geometrical parameters of the light source comprise at least one of: shape of light emitting surface of the light source, size of the light source, parameters of visible optical elements in the light source, characteristics of the luminaire in which the light source is provided. Visual optical elements are, for example, visible reflectors, anti-glare lamellas, etc. The characteristics of the luminaire comprise a shape, a size, a mounting and a type of luminaire.

Optionally, the characteristics of the light beam comprise at least one of: spatial light emission distribution, spatial light intensity distribution.

Optionally, the method further comprises the stages of i) analyzing the second image to determine whether the illuminated environment is also illuminated by additional light sources, the additional light sources comprising additional light emitters, ii) obtaining additional first images of the additional light sources, iii) obtaining additional first camera settings, wherein the additional first camera settings represent the parameters of the image processing system and of the optical system of the first camera used at the moment of time when the additional first images were obtained. In the stage of analyzing the first image and analyzing the first camera settings the additional first images and the additional first camera settings are also analyzed to estimate the influence of the additional light source on the illuminated environment of the second image such that the second parameters and/or first parameters of the light source can be estimated more accurately. Thus, when more than one light source illuminates the environment, the information about the light source that is present in the second image may be distorted. If information of the additional light sources is taken into account, it is better possible to distinguish between lighting effects in the illuminated environment that originate from the light source from lighting effects that originate from the additional light sources. Consequently, the second parameters and also the first parameters of the light source can be estimated more accurately.

Optionally, the step of analyzing the second image to estimate whether the illuminated environment is also illuminated by additional light sources comprises the stages of: i) detecting an object in the illuminated environment, ii)

detecting shadows around the detected object, iii) analyzing the detected shadows to estimate whether the illuminated environment is illuminated by additional light sources. The optional stages of this embodiment provide an heuristic to detect whether other additional light sources are in operation at the moment in time when the second image was obtained. Heuristics are often powerful algorithms to obtain information with a certain accuracy level. In an additional stage, the number of detected additional light sources may be provided to a user who operates the first and/or second camera and a confirmation is requested. It is to be noted that other heuristics may also be used to estimate whether the illuminated environment is also illuminated by additional light sources. It is to be noted that the stages i) and ii) may also be performed in another order, depending on the used specific heuristics and specific algorithms.

Optionally, the method of characterizing a light source additionally comprises the stage of analyzing the additional first images and analyzing the additional first camera settings to estimate additional parameters of the additional light sources, wherein the additional parameters of the additional light sources relate to characteristics of light emitted by the additional light emitters and relate to geometrical parameters of the additional light sources. It might be useful, in certain applications, to have also the additional parameters of the additional light sources available. Furthermore, the additional parameters may be used to better distinguish between lighting effects originating from the light source and lighting effects originating from the additional light source in the second image.

Optionally, the light source is controllable in a first operational mode and a second operational mode, each one of the first operational mode and the second operational mode relates to a specific light emission, the light emission of the first operational mode is different from the light emission of the second operational mode. The first image is obtained from the light source when the light source was operating in the first operational mode. The method of characterizing a light source additionally comprises the stages of: i) controlling the light source into the second operational mode, ii) obtaining a further first image of the light source in operation in the second operational mode by means of the first camera, iii) obtaining further first camera settings, wherein the further first camera settings represent the parameters of the image processing system and of the optical system of the first camera used at the moment in time when the further first image was obtained, and iv) analyzing the further first image and analyzing the further first camera settings to estimate further parameters of the light source in relation to the second operational mode, wherein the further parameters of the light source related to characteristics of light emitted by the light emitter and relate to geometrical parameters of the light source. Thus, when, for example, the light source may be dimmed to a specific light intensity level, or, when, for example, the light source can be switched towards emissions of different color distributions, this optional embodiment provides means to estimate the characteristics of the light source when the light source is operating in different operational modes. Thus, the light source is better characterized. The optional embodiment relates to a first and a second operational mode, but the light source may operate in more than two operational modes and in an optional embodiment, the characteristics of the light source are estimated for each one, or a sub-set of the plurality of operational modes.

Optionally, in the stage of obtaining the first image, stages of obtaining the additional first images, and/or stages of obtaining the further first image comprises the stages of: i) instructing a user to direct the first camera to, respectively, the light source, the additional light source or the light source operating the second operational mode, ii) detecting on basis of information of the image processing system whether the amount of received light exceeds a minimum value, iii) obtaining the respective image when the amount of received light exceeds the predetermined minimum value. This optional embodiment prevents that incorrect first images, incorrect additional first images and/or incorrect further first images are obtained because only if the minimum value is exceeded the probability that a light source in operation is imaged is relatively high. The minimum value may be predetermined or may be set dynamically, for example, in dependence of the average lighting conditions of the environment.

Optionally, the stage of analyzing the first image and analyzing the first camera settings to estimate the first parameters of the light source comprises the stages of: i) comparing the first image with images of light sources stored in a database to find an image of a light source that is similar to the first image, the database also stores together with the images of the light sources information about the parameters of the light source, ii) obtaining the first parameters from the database by obtaining parameters of the light source of the found image that is similar to the first image. It might be that certain databases with images of light sources are available. For example, a manufacturer of light sources might provide such a database. Using such a database may lead with a relatively small effort to obtaining very accurate first parameters (assuming that the database comprises accurate information). It is to be noted that, as discussed previously, in the stage of analyzing the first image and analyzing the first camera settings to estimate the first parameters of the light source, specific techniques are used, such as specific optical calculations to estimate the light intensity and/or the color of the received light and image recognition techniques to estimate geometrical parameters of the light source. This optional embodiment may be used in addition to the specific techniques and the data obtained from such techniques is used to find the most similar image of a light source in the database. Alternatively, this optional embodiment may be used instead of applying the specific techniques.

Optionally, the first camera is also configured to image the light source in the infrared spectral range to obtain a heat signature of the light source and wherein, in the stage of analyzing the first image and analyzing the first camera settings to estimate the first parameters of the light source, the heat signature is also analyzed to obtain further characteristics of the light source which relate to the operational conditions of the light source. Additional characteristics of the light source may be obtained from the heat signature and by using such a heat signature the light source may be characterized more accurately.

Optionally, the first camera and/or the second camera are hyper spectral cameras. Conventional digital cameras use an RGB sensor array that creates an image which is a representation and estimation of the electromagnetic waves that are received in the spectrum that is visible to the human naked eye. A hyper spectral camera collects and processes information in more ranges of the complete electromagnetic spectrum and in narrower spectral bands. A hyper spectral camera generates, in specific embodiments, different images for different spectral ranges. Hyper spectral cameras are capable of collecting more information and if more information is obtained, characteristics of the light source can be estimated more accurately.

According to a further aspect of the invention, a method of selecting a replacement light source is provided. The method comprises the stages of the method of characterizing a light source and further comprises the additional stages of: i) selecting from a list of replacement light sources and/or replacement light emitters a replacement light source and/or a replacement light emitter, wherein the replacement light source and/or the replacement light emitter have at least one parameter that is similar to one of the first parameters and/or the second parameters of the light source, ii) proposing the selected replacement light source and/or the selected replacement light emitter to a user. These optional additional stages may be used in an automatic system which proposes to the user a list of replacement light emitters and/or the replacement light sources for the light source characterized. Thereby it has been prevented that the user has to keep track of which specific types of light sources are installed and/or that the user must manually compare characteristics of the installed light sources with available replacement light emitters and replacement light sources. Thus, this optional embodiment is relatively user friendly. The list may be retrieved from a database. For example, when a manufacturer of light emitters and light sources provides a database with available light emitters and light source, it is advantageous to use this database in the method of characterizing a light source to select from this particular manufacturer a replacement light emitter or light source.

Optionally, the stage of selecting the replacement light source and/or the replacement light emitter also takes into account the further parameters of the second operational mode of the light source. When the light source may operate in different operational modes, it would be nice to select a replacement light source and/or a replacement light emitter which also has different operational modes with similar parameters. This optional embodiment enables a selection of a replacement light source/light emitter which has several operational modes, at least some of them being similar to operational modes of the light source.

Optionally, the method of characterizing a light source comprises the stages of simulating an influence of the selected replacement light source and/or the selected replacement light emitter on the illuminated environment. The illuminated environment is the environment that is imaged in the second image. The simulating of the influence of the selected replacement light source and/or the selected replacement light emitter on the illuminated environment comprises creating an adapted second image showing the influence of the selected replacement light source and/or the selected replacement light emitter on the environment. The adapted second image is presented to the user. This optional embodiment is in particular user friendly when the selected replacement light source and/or the selected replacement light emitter does not exactly have the same first parameters and/or the same second parameters as the light source, because the user now is provided with additional information which assists him to judge whether the differences are acceptable or not.

Optionally, the selected replacement light emitter and/or the selected replacement light source may operate in a third operational mode and in a fourth operational mode. In each one of the third operational mode and the fourth operational mode, the selected replacement light emitter and/or the selected replacement light source emits specific light. The light emission of the third operational mode may be different from the light emission of the fourth operational mode. The obtained adapted second image may relate to the third operational mode of the selected replacement light source and/or the selected replacement light emitter. The method now further comprises the stages of i) simulating an influence of the selected replacement light source and/or the selected replacement light emitter on the environment, the simulation relates to the operation of the selected replacement light source and/or the selected replacement light emitter in the fourth operational mode, ii) creating a further adapted second image showing the result of the simulating of the influence, iii) presenting the further adapted second image to the user. This optional embodiment provides the user with additional information about what may be the influence of additional operational modes of the selected replacement light source and/or the selected replacement light emitter, and is, thus, user friendly.

According to another aspect of the invention, a computer program is provided which comprises computer program code adapted to perform the stages of the method of characterizing a light source or of the method of selecting a replacement light source when the computer program is run on a computer. Optionally, the computer program is embodied on a computer readable medium.

According to a further aspect of the invention, a downloadable application for a mobile computing device is provided. The downloadable application comprises a computer program comprising computer program code adapted to perform the stages of the method of characterizing a light source or of the method of selecting a replacement light source when the computer program is run on a processing unit of the mobile computing device. The mobile computing device is, for example, a smart phone or a tablet computer.

According to another aspect of the invention, a device for characterizing a light source is provided. The device comprises a first camera, a data storage and a processing unit. The first camera comprises an image processing system and an optical system of which, while obtaining an image with the first camera, parameters are adjusted to obtain the image of an imaged object or environment. The data storages stores a computer program comprising computer program code adapted to perform the stages of the method of characterizing a light source according to any one of the above discussed embodiments of this method or the stages of the method of selecting a replacement light source according to any one of the above discussed embodiments of this method. The processing unit is coupled to the data storage and to the first camera and is configured to execute the computer program stored on the data storage. Optionally, the device is a mobile device.

The device according to the second aspect of the invention provides an apparatus to a user which may be used to characterize a light source. The devices assist in automatically characterizing light source. Further, when the device is a mobile device, it does not take a lot of effort to carry the device to the location where a light source must be characterized, for example, when the light source must be replaced.

The parameters of the first camera may be automatically adjusted by the first camera, and/or one or more of these parameters of the first camera may be adjusted by the user of the device. For example, the user may select the ISO value, or the user may use a zoom function to adjust the focal point of a lens of the first camera.

Optionally, the computer program is stored in the device on the data storage such as, for example, a hard disk, volatile or non-volatile memory, etc.

Optionally, the device comprises a second camera and optionally the second camera comprises an image processing system and an optical system of which, during obtaining an image with the first camera, parameters are adjusted to obtain a quality image of an imaged object or environment the image processing system may be shared with the first camera. It is to be noted that when the device only comprises a first camera, the first image and the second image may be obtained placing the first camera first at the first position in the first direction and thereafter repositioning the first camera towards the second position into the second direction for obtaining the second image.

Optionally, the device comprises a user interface to provide instructions to the user of the device and to present images to the user.

Optionally, the processing unit is also configured to execute a further computer program which comprises instructions to instruct via the user interface of the device a user of the device to obtain the first image of the light source with the first camera and to present the obtained image to the user. The provision of instructions to the user assists the user in the operation of the device such that the obtained first image correctly images the light source.

Optionally, the further computer program also comprises instructions to instruct the user to direct the device in a substantially opposite direction to obtain the second image of the illuminated environment and to present the obtained image to the user. The provision of instructions therefore assists the user in executing the different stages of the various methods as described above.

Optionally, when the processing unit of the device also determines a replacement light source or replacement light emitter and when the processing unit also simulates the influence of the replacement light source or replacement light emitter to obtain an adapted second image, the device may be configured to present the adapted second image on a display of the user interface of the device.

The device according to the second aspect of the invention provides the same benefits as the method of characterizing a light source according to the first aspect of the invention and has similar embodiments with similar effects as the corresponding embodiments of the method.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the method, and/or of device, which correspond to the described modifications and variations of the method can be carried out by a person skilled in the art on the basis of the present description.

Figure 1:
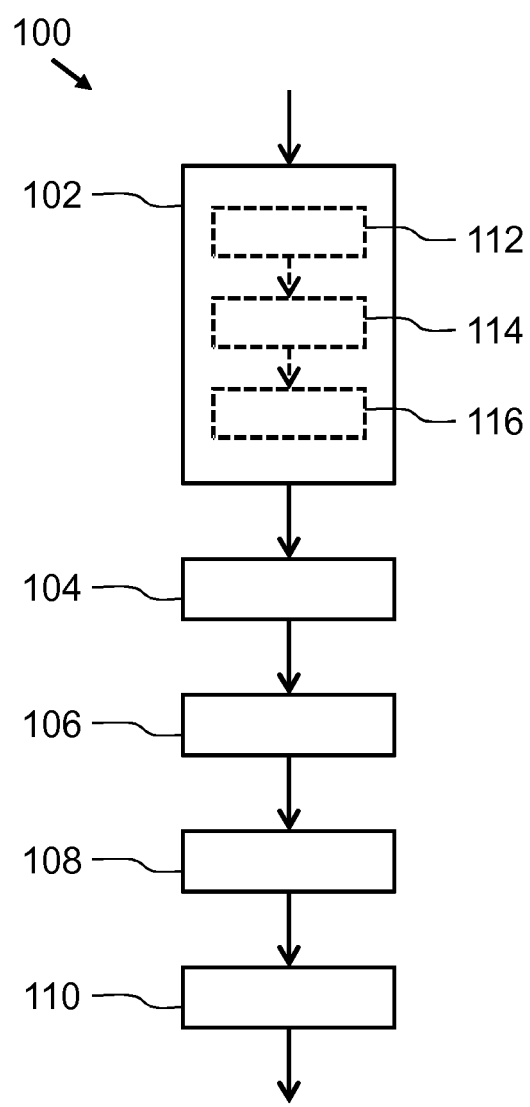
FIG. 1 schematically shows a method of characterizing a light source.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

A first embodiment is shown in FIG. 1. FIG. 1 schematically shows a method 100 of characterizing a light source. The method comprises the stages of: i) obtaining 102 a first image of the light source in operation by means of a first camera, ii) obtaining 104 first camera settings, wherein the first camera settings represent the parameters of an image processing system and of an optical system of the first camera used at the moment in time when the first image was obtained, and iii) analyzing 110 the first image and analyzing the first camera settings to estimate first parameters of the light source, wherein first parameters of the light source relate to characteristics of light emitted by the light emitter and relate to geometrical parameters of the light source. In an optional embodiment of the method 100, the method 100 further comprises the stages of iv) obtaining 106 a second image of an illuminated environment being illuminated by the light source by means of a second camera, wherein the first image is obtained from a first position in a first direction and the second image is obtained from a second position in a second direction being different from the first direction, and v) obtaining 108 second camera settings, wherein the second camera settings represent parameters of an image processing system and of an optical system of the second camera used at the moment in time when the second image was obtained, wherein, in the stage 110 of analyzing the first image and analyzing the first camera settings, the second image and the second camera settings are also analyzed to estimate second parameters of the light source and to more accurately estimate the first parameters of the light source, wherein the second parameters of the light source relate to characteristics of a light beam emitted by the light source. The second parameters comprise, for example, information relating to a shape of the light beam emitted by the light source.

Figure 2:
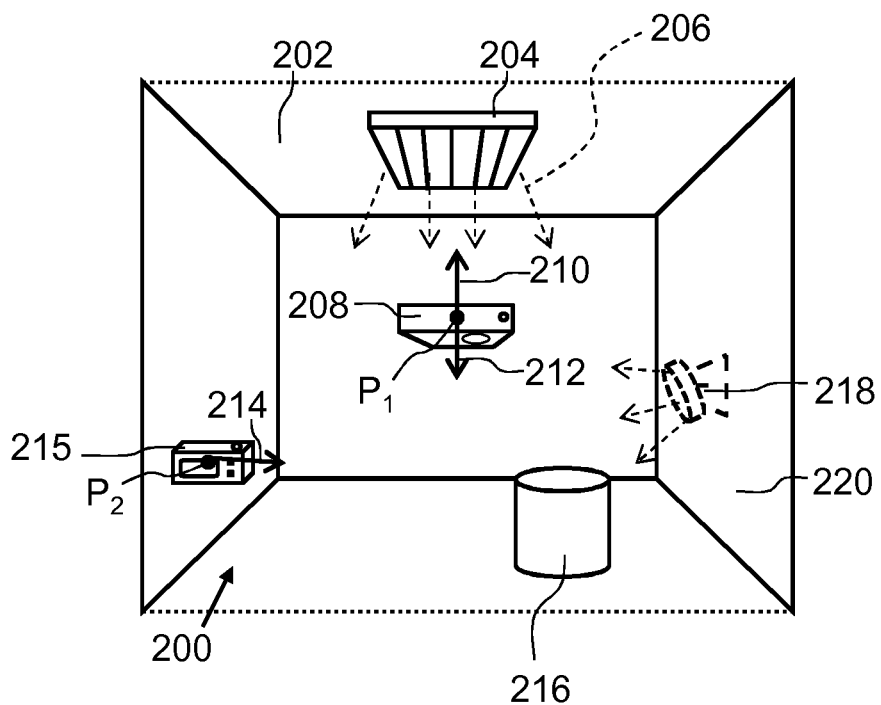
FIG. 2 schematically shows a light source in an environment that it illuminates and schematically shows cameras for obtaining a first and second image, FIG. 3a schematically shows a first image of a light source, FIG. 3b schematically shows a second image of an illuminated environment, FIG. 4a schematically shows a second image of an environment that is illuminated by two light sources, FIG. 4b schematically shows optional stages for the method of the invention, FIG. 5a schematically shows optional additional stages for the method of the invention, FIG. 5b schematically shows optional additional stages for the method of the inventions, FIG. 6a schematically shows a further first image, FIG. 6b schematically shows an adapted second image, and FIG. 7 schematically shows an embodiment of a mobile device.
Figure 3A:
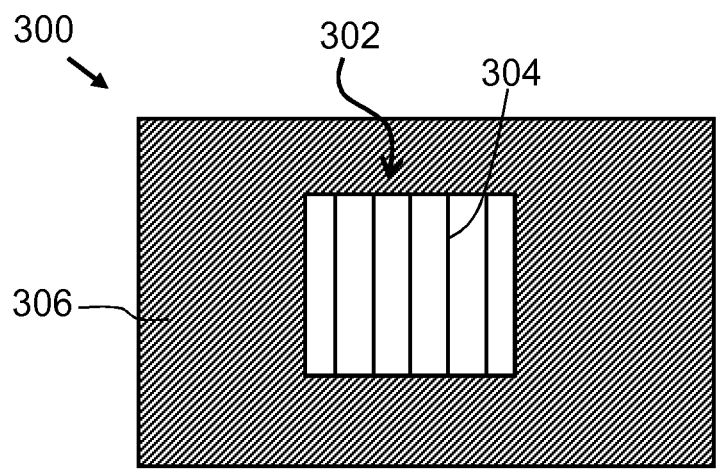
Figure 3B:
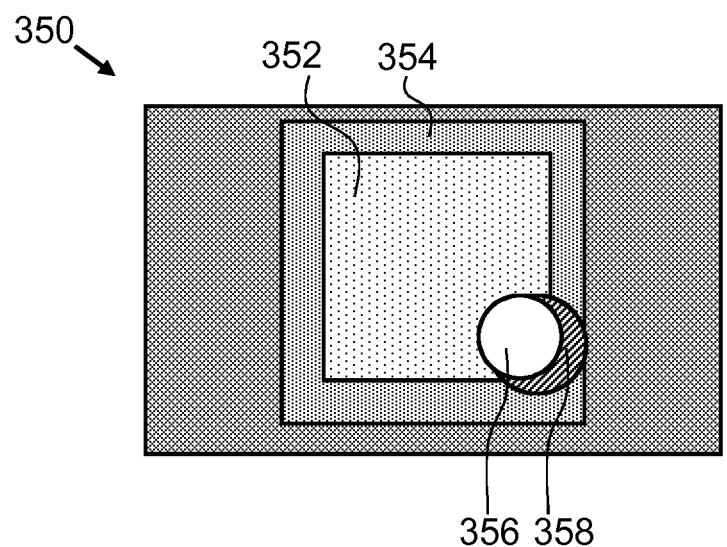

The operation of the stages 102 to 110 is explained in more detail with FIG. 2 and FIGS. 3a, 3b. FIG. 2 presents an interior 200 of a room. The room is just an example, other rooms or spaces, or even outdoor spaces, may also be the area in which the method of characterizing a light source is used. At a ceiling 202 of the room is provided a light source 204. The light source 204 has a square size and comprises anti-glare lamella in front of a light emitter of the light source 204. The light source 204 emits a light beam 206 in a downward direction. As an example, a cylindrical object 216 is positioned in the room.

In an example, a first camera 208 obtains a first image from the light source from a first position $P_1$ in a first direction 210. In FIG. 3 an exemplary first image 300 is shown. As discussed previously, the first camera comprises an optical system and image processing system and at the moment of obtaining the first image 300 specific parameters of the optical system and the image processing system are adapted to specific values such that the obtained image is a relatively good image. A user may influence the values of the parameters, or the first camera 208 may automatically adapt the values of the parameters to obtain the relatively good image. Relatively good means that the object is imaged in the first image 300 with a relatively good color balance, a relatively good contrast, a relatively good intensity level, and is optionally also imaged sharply in the first image 300. Examples of such parameters of the camera are shutter speed, aperture size, ISO value, parameters of color corrections, white balance parameters, focal point of lens system, etc. The actual values of these parameters are read out to obtain the first camera settings.

Subsequently, the first image 300 is analyzed, together with the analyzing the first camera settings, to estimate the first parameters of the light source. In the first image a bright area 302 may be seen with vertical dark lines. Around the bright area is a more dark area 306. While analyzing the first image 300, bright areas 302 are found which relate to the light emitting surface of the light emitter of the light source and/or to reflectors of the light source which reflect the light emitted by the light emitter towards the camera. The color and intensity of the pixels of the bright area 302 comprise information about characteristics of the light that is emitted by the light emitter of the light source 204. In order to transform a value of, for example, a received light flux at the lens of the first camera 208 into first parameters of the light source, in addition to the image the first camera settings must be analyzed because, if the shutter speed was relatively fast, the received light flux was relatively high. If the aperture size was relatively large, the received light flux was relatively low. Skilled persons in the field of light and optics are capable to apply formulas, calculations, heuristics and/or algorithms to transform the information of the pixels of the first image 300 and the first camera settings towards information about the light that has been emitted by the light emitter of the source. Examples of such characteristics are emitted light intensity, light emission spectrum, color point of the emitted light, color temperature of the emitted light. Reference is made to the articles "Measuring Luminance with a Digital Camera", by Hiscocks, P. D. of Syscomp electronic Design Limited, and published via the internet http://www.ee.ryerson.ca:8080/~phiscock/astronomy/light-pollution/luminance-notes.pdf. This article describes how a digital camera can be used to measure a luminance of a light source and how camera settings must be taken into account.

Further, in the stage of analyzing 110 optionally geometrical parameters of the light source are obtained, such as, for example, shape of light emitting surface, size of the light source 204, parameters of visible optical elements in the light source 204 (such as the anti-glare lamella of the example), characteristics of the luminaire in which the light source 204 is provided. The characteristics of the luminaire comprise a shape, a size, a mounting and a type of luminaire. Pattern recognition techniques and geometrical transformations of the first image 300 of the light source 204 may be used to obtain these geometrical parameters.

The well-visible dark lines 304 relate to an object which block the light transmission and may be recognized as optical elements visible from the first position $P_1$. Pattern recognition techniques may be used to determine what kind of optical element is provided in the light source 204.

Alternatively, or additionally, in the stage of analyzing the first image 300 and the first camera settings, a database is consulted which comprises images of light sources. This database stores the images of the light sources accompanied by parameters of these imaged light sources. Pattern recognition techniques and image comparison techniques may be used to find in the database a light source that might, with a relatively high probability, be imaged in the first image 300. The first parameters of the light source are subsequently retrieved from the database.

As can be seen in FIG. 1, in an optional embodiment, the method 100 comprises also the stages of i) obtaining a second image in stage 106, and ii) obtaining second camera settings in stage 108. In the stage 110 of analyzing the first image and analyzing the first camera settings, second image and the second camera settings are also analyzed to estimate second parameters of the light source and to more accurately estimate the first parameters of the light source, wherein the second parameters of the light source relate to characteristics of a light beam emitted by the light source.

In FIG. 2 a second camera 215 is shown at the second position $P_2$, and the second camera 215 may obtain the second image in the direction 214. As shown, the second camera 215 is able to image the room when it is illuminated by the light source 204. The direction 214 is not equal to the first direction 210. Alternatively, the first camera 208 comprises a second camera system which is able to obtain the second image from substantially the same first position $P_1$ in a second direction 212 that is substantially opposite to the first direction 210. For example, the first camera 208 is incorporated in a mobile phone or tablet computer which comprises the first camera 208 at a first side and which comprises a second camera at a second side that is opposite the first side. The first camera 208 may also be a digital camera with only a single camera system (optical system, etc.) and after obtaining the first image 300, a user turns around the first camera 208 at the first position $P_1$ to obtain the second image 350 in the second direction 212.

It is relatively difficult to detect information about specific characteristics of the light beam 206 of the light emitted by the light source 204 in the first image 300 only. Such specific characteristics are, for example, spatial light emission distribution and spatial light intensity distribution. The first image 300 does not show how wide or narrow the light beam 206 is and does not show how the light intensities vary at different light emission directions because the first camera mainly receives at the first position $P_1$ only small portion of the light that has been emitted by the light source 204. The second image, either taken by the second camera 215 from the second position $P_2$ into the direction 214 or taken by the first camera 208 form the first position $P_1$ into the second direction 212, registers reflected light and as such there is information in the second image that relates to the light beam 206.

An exemplary second image 350 is shown in FIG. 3b. The second image 350 is taken by the first camera 208 from the first position $P_1$ into the second direction 212. Thus, the second image 350 images the light reflection pattern of the floor of the room 200 and the light reflection by the top surface of the object 216. In second image 350 a relatively bright square 352 with a less bright area 354 around it can be seen. The relatively bright area 352 is a footprint of the light beam 206 of the light source 204. Such areas may be recognized in the analyzing step 110 and based on the shape of the footprint of the light beam 206, a spatial light emission distribution may be estimated, for example, that the cross-sectional shape of the light beam 206 has a substantially square shape and that the light source 204 emits light up to a specific light emission angle with respect to a normal to the ceiling (and, thus, with respect to the light emitting surface of the light source 204). For the determination of the light emission angle, the position $P_1$ of the first camera may be taken into account. The less bright area 354 provides more information about the spatial light intensity distribution of the light beam 206. In the analysis it is found that the light source 204 emits lower light intensities at larger light emission angles. Pattern recognition techniques, and finding relations, e.g. correlations, between the imaged light source in the first image 300 and the imaged shapes 352, 354 in the second image 350 may lead to the conclusion that the light beam has a substantially square cross-sectional shape. When the estimated shape of the light source 204 as imaged in the first image 300 and information of the second image 350 are correlated to each other, the brightest circle 356 may be identified as an area of the second image 350 that is most probably not related to the light beam 206 of the light source 204, but is most probably a surface of an object. This is furthermore confirmed by the dark area 358 which seems to be a shadow. Pattern recognition techniques may be used to detect shadows of objects. The shadows provide a lot of information about the light source characteristic such as, for example, a diffusiveness of the light of the light beam 206. For example, if the shadow 358 gradually becomes less dark, the light of the light beam 206 is relatively diffuse (which means: within the light beam 206, light is emitted in several directions). When the borders of the shadow 358 are relatively sharp, the light in the light beam 206 is not diffuse, which means that, when the light beam is subdivided into sub-portions, almost all light rays of a sub-portion are emitted in substantially the same direction.

Thus, the analysis of the second image 350 results in the estimation of second parameters that are characteristics of the light beam 206 emitted by the light source 204. The information of the second image 350 may also be used to more accurately estimate the first parameters. For example, if in the second image 350 the illuminated environment reflects, within certain accuracy levels, about the same color of light, this color of the reflected light strongly relates to the color of light emitted by the light source. Thus, the reflected light may be used to fine tune estimated parameters of the light emitted by the light source 204. It is to be noted that it may also work the other way around. When, based on the first image, the color of the emitted light is known, the reflected light as present in the second image may be used to estimate colors of surfaces of the illuminated environment.

It is to be noted that, when the second image 350 is not taken from the first position $P_1$ and/or not in the second direction 212, the second image 350 looks differently and geometrical transformation techniques may be used to transform the second image into an image that is similar to the image of FIG. 3b. However, transforming the second image in such a similar image is not always necessary, because, while analyzing the second image to obtain the second parameters of the light source, the geometrical relations between the information present in the second image and the direction of the light beam emitted by the light source 204 may already be taken into account.

FIG. 1 further presents sub-stages of the stage 102 of obtaining the first image 300. In stage 112, the user is instructed to direct the first camera to the light source. When, as will be discussed later in this application, images of other light sources must be made, the user is instructed to direct the first camera towards the other light sources. In stage 114, the first camera detects on basis of information of the image processing system whether the amount of received light exceeds a minimum value. This minimum value may be predetermined, or may be varies according to environmental conditions (such as, for example, the average lighting conditions of the environment). Determining the amount of received light comprises, for example, integrating the lighting intensity over an area of an image sensor of the first camera and applying corrections for, e.g., the aperture size and focal distance. In stage 116, the respective image is obtained with the first camera when the amount of the received light exceeds the minimum value. Optionally, stage 106 comprises sub-stages in which the user is instructed to move the first camera or the second camera towards the illuminated environment.

It is to be noted that in an optional embodiment, the first camera and/or the second camera register mainly light in a spectral range that is visible to the human naked eye. In another embodiment, the first camera, and optionally the second camera, is also configured to image the light source in the infrared spectral range (besides imaging the light source in the visible spectral range) to obtain a heat signature of the light source. In this embodiment, the stage 102 of obtaining the first image also comprises obtaining the heat signature, and the stage 110 of analyzing the first image and the first camera settings also comprises analyzing the heat signature to (more accurately) estimate first parameters and/or second parameters. For example, when the light source 204 comprises an incandescent lamp, the heat profile may provide information about the possible temperature of a filament, which often relates to the use of specific materials in the filament itself and/or the use of specific gasses in the incandescent lamp. For example, the traditional light bulb and halogen lamps are embodiments of incandescent lamps. However, other materials are used in these lamps resulting in, for example, other heat signatures—consequently, different heat signatures can be used to distinguish between, for example, the traditional light bulb and halogen lamps.

In an optional embodiment, the first camera and/or the second camera are a hyper spectral camera. Conventional cameras create an image of the electromagnetic waves that are received in the spectrum that is visible to the human naked eye. A hyper spectral camera collects and processes information in more ranges of the complete electromagnetic spectrum. Examples of such additional ranges of the electromagnetic spectrum in which information is collected and processed are for example the infrared spectral range and the near Ultra Violet spectral range. A hyper spectral camera generates, in specific embodiments, different images for different spectral ranges. Hyper spectral cameras are capable of collecting more information and if more information is obtained, characteristics of the light source can be estimated more accurately. All information obtained by or portions of the information obtained by the hyper spectral cameras may be used in the stage 110 of analyzing the first image and the first camera settings to (more accurately) estimate first parameters and/or second parameters. For example, electromagnetic waves emitted at other wavelengths than the wavelengths of the visible spectral range provide information about the materials used in the light emitter of the light source. They may also reveal that some UV wavelengths responsible for black light effects are present in the light emission.

Figure 4A:
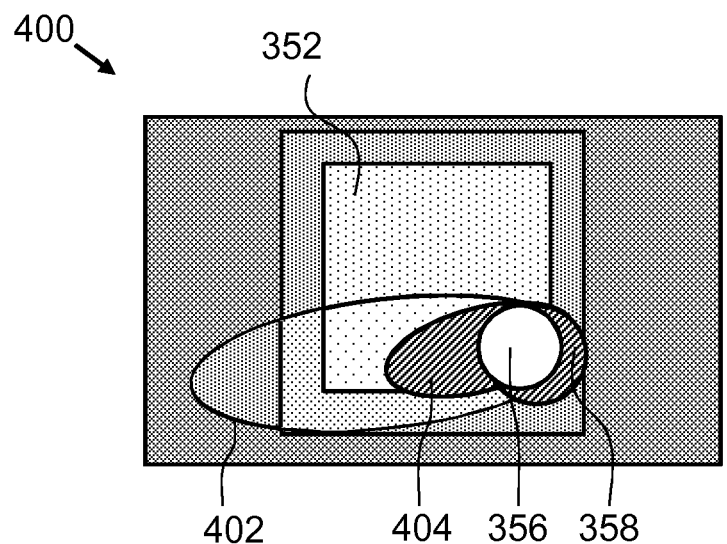
Figure 4B:
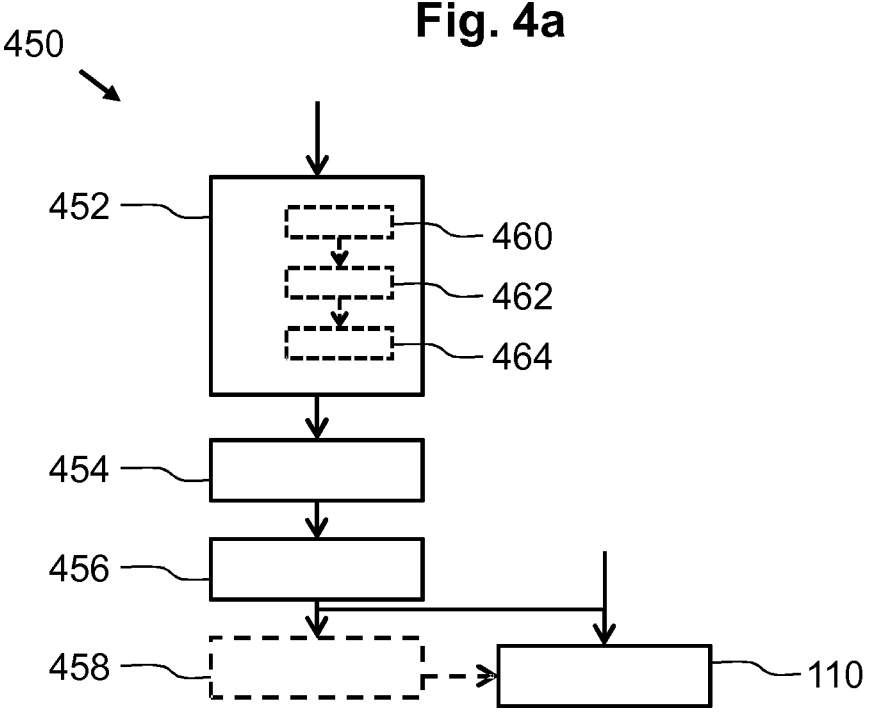

In FIG. 2 a second light source 218 has been drawn which also illuminates a portion of the room 200. If we assume that this second light source 218 has been switched on, the second image 350 of FIG. 3b would look differently and more resemble the second image 400 of FIG. 4a. In the second image 400 it is seen that there are two bright areas, formed by square 352 and ellipse 402. Also a second shadow may be seen 404. In an optional embodiment of the method, the second image 400 is also analyzed to determine whether the illuminated environment is illuminated by additional light source. This stage 452 of analyzing the second image to find additional light source 452 may be subdivided into the stages of: detecting an object 356 in the second image 400 in stage 460, detecting shadows 404, 356 around the detected object 356 in stage 462, and analyzing the detected shadows 404, 356 to estimate whether the illuminated environment is illuminated by additional light sources in stage 464. In a further optional embodiment, the number of detected light sources is communicated to the user such that the user can confirm (or change) the number of light source that were in use at the moment when the second image was obtained.

Subsequently, when it has been detected that the illuminated environment is illuminated by additional light source(s), additional first images from the additional light source(s) 218 are obtained in stage 454, and additional first camera settings are obtained in stage 456. The additional first camera settings represent the parameters of the image processing system and of the optical system of the first camera used at the moment of time when the additional first images were obtained. Subsequently, in an optional stage, the additional first image and the additional first camera settings are analyzed in stage 458 to estimate additional parameters of the additional light sources. The additional parameters of the additional light sources relate to characteristics of light emitted by the additional light emitters and relate to geometrical parameters of the additional light sources. The additional first images and the additional first camera settings are also taken into account in the stage 110 of analyzing the first image and the first camera settings and the second image and the second camera settings, to estimate the first parameters and/or the second parameters more accurately. For example, when it is known that the additional light source emits a specific color, it can be seen from the second image 400 how this additional light source influences the imaged illuminated environment. Determining the influence of the additional light sources leads to more knowledge about the lighting effects in the illuminated environment, such that in the step 110 of analyzing, the lighting effect of the light source 204 on the illuminated environment can be better isolated from all other visible light effects.

FIG. 5a presents additional stages 500 which may be added to the method 100 of FIG. 1. The additional stages 500 relate in particular to situations in which the light source may operate in different operational modes wherein the light source emits a different light emission in each one of the operational modes. For example, the light emitter may be controlled in a first operational mode wherein it emits 100% of a maximum light intensity, and may be controlled in a second operational mode wherein it emits 50% of the maximum light intensity. It is to be noted that the operational modes may also relate to the emission of different color spectra, like more warm white light or more cool white light, or that the different operational modes may also relate to the emission of different light beams, like a more wide light beam or a more narrow light beam. It is further to be noted that in the context of this document "operational mode" relates to a mode wherein at least some light is emitted and does not relate to the "off" state of the light source. It is further assumed that the first image is taken in stage 102 when the light source was operating in the first operational mode. The additional stages are: controlling the light source to operate in the second operational mode in stage 502, obtaining a further first image of the light source in operation in the second operational mode by means of the first camera in stage 504, obtaining further first camera settings in stage 506, and analyzing the further first image and analyzing the further first camera settings to estimate further parameters of the light source in relation to the second operational mode in stage 508. The further parameters of the light source relate to characteristics of light emitted by the light emitter and relate to geometrical parameters of the light source and the further first camera settings represent the parameters of the image processing system and of the optical system of the first camera used at the moment in time when the further first image was obtained.

Figure 6A:
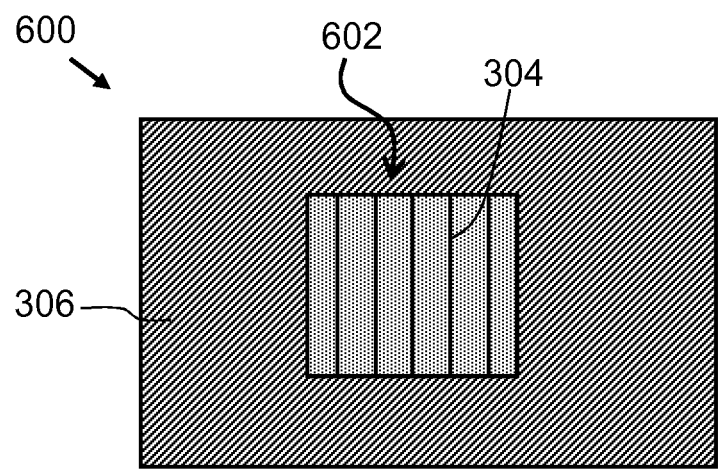

FIG. 6a presents an example of a further first image 600 which is obtained in stage 504. In this example it is assumed that the further first image 600 of the light source 204 is obtained from the first position $P_1$ in the first direction 210 (see FIG. 2) and that the light source 204 is operating in a second operational mode in which the light source 204 emits a lower light intensity. The relatively bright square 602 in the middle of the image is less bright than the square 302 of the first image 300 of FIG. 3a which indicates that the light source 204 emits a lower light emission in the second operational mode. In another embodiment, the further first image 600 is almost the same as the first image 300 of FIG. 3a (which means that square 602 has almost the same brightness as the square 302 of the first image 300), but the further camera settings indicated that the shutter time was longer, that the aperture size was larger, and/or that the ISO value was higher. In that situation, in the stage 508 of analyzing the further first image and the further first camera settings, the combination of the further first image 600 and the further first camera settings immediately provide the information that the light source 204 emits in the second operational mode less intense light and the combination of the further first image 600 and the further first camera settings can be used to estimate the actual amount of light that is emitted by the light source in the second operational mode (as well as other parameters may also be estimated on basis of this information).

FIG. 5b presents additional stages 550 which may be added to the method 100 of FIG. 1. The stages 550 provide to the user a method which characterizes a light source and which proposed to the user a replacement light source or replacement light emitter. It is assumed that a list with replacement light sources and/or replacement light emitters is available and that, together with the replacement light sources and/or replacement light emitters, parameters are stored. Such parameters provide information about for example the operational modes and characteristics of the light emitted by the replacement light source and/or light emitter, and/or for example characteristics of the light beam emitted by the replacement light sources and/or light emitters. This list may be available in a database and accessible by the method stages 550. The additional stages 550 at least comprise the stages of: i) selecting in stage 552 from the list of replacement light sources and/or replacement light emitters a replacement light source and/or a replacement light emitter, wherein the replacement light source and/or the replacement light emitter has at least one parameter that is similar to one of the first parameters and/or the second parameters of the light source, ii) proposing in stage 554 the selected replacement light source and/or the selected replacement light emitter to a user. It is to be noted that one similar parameter should be enough for selecting the replacement light source and/or the replacement light emitter. However, in an embodiment the replacement light emitter and/or replacement light source is selected which has a relatively large number of parameters which are similar to first parameters and/or second parameters of the light source. Optionally, the replacement light emitter and/or replacement light source is selected which has most parameters in common with the first parameters and/or the second parameters of the light source. In an optional embodiment, when the light source has different operational modes, the further parameters are also taken into account and the proposed replacement light source and/or replacement light emitter has also such an additional operational mode with similar parameters in this additional operational mode. Proposing the replacement light source and/or light emitter may be done via a display and/or user interface of, for example, the first or second camera, or device of a system executing the method according to the invention.

In an embodiment, the additional stages 550 may also comprise the stages of: iii) simulating in stage 556 an influence of the selected replacement light source and/or the selected replacement light emitter on the illuminated environment, iv) creating in stage 558 an adapted second image showing the result of the simulation in stage 556 on the environment, v) presenting in stage 560 the adapted second image to the user. When a light source is replaced, it is often not possible to obtain a replacement light source and/or replacement light emitter which comprises exactly the same parameters as the light source. Before the user decides to replace the light source, it may be advantageous to show to the user the effect of the replacement, as provided by the above additional stages iii) to v). The presenting of the adapted second image may be done via a display and/or user interface of, for example, the first or second camera, or a device of a system which runs the method according to the invention.

Several methods are known in the art to simulate the effect of a light source and/or light emitter on an environment. For example, in the article "Application of RELUX software in Simulation and Analysis of Energy Efficient Lighting Scheme", Shailesh, K. R. et al, International Journal of Computer Applications, Vol 9, No 7, November 2010, discusses the application of such automatic methods in a specific case study. Another article which describes such methods is "Advanced Lighting Simulation Tools for Daylight purposes: Powerful Features and Related Issues", Bhavani R. G., et al, Trends in Applied Sciences Research, Vol. 6, Issue 4, 2011 Lighting or illumination effects of the light source can be recognized in the illuminated environment (as imaged in the second image) by using, for example, the first parameters and the second parameters of the light source, after which the recognized lighting or illumination effects can be replaced by lighting or illumination effects of the replacement light source and/or replacement light emitter. The generation of the lighting or illumination effects of the replacement light source and/or replacement light emitter may be done on the basis of parameters of the replacement light source and/or replacement light emitter that can be obtained from a list or database with replacement light sources and/or replacement light emitters.

In an embodiment, the simulation stage 556 of the influence of the selected replacement light source and/or the selected replacement light emitter and the creation stage 558 of the adapted second image may be performed by the subsequent steps: (i) the second image is decomposed in three sub-images which relate each to a color channel (red, blue and green), (ii) subsequently adjustment ratios are calculated for each color channel (red, blue and green) wherein the adjustment ratios represent the amount of light in the color channel emitted by the selected replacement light source and/or the selected replacement light emitter divided by the amount of light in the color channel emitted by the light source, (iii) multiplying the values of the pixels of each sub-image (representing one specific color channel) with the adjustment ratio for that specific color channel to obtain adapted sub-images, and finally (iv) the adapted second image is created by combining the adapted sub-images. It is to be noted that decomposing an image into different sub-images representing specific color channels and combining adapted sub-images into the adapted image is well-known to the skilled person—almost every image processing program is capable of performing the decomposition and combining steps.

It is to be noted that the steps of simulating 556, creating 558 and presenting 560 the adapted second image may also be performed for different operational modes of the selected replacement light source and/or the selected replacement light emitter.

It is further to be noted that, additional second images of the illuminated environment may be obtained from the second position $P_2$ in the direction 214, or from the first position $P_1$ in the second direction 212. The additional second images are obtained when the light source is switched off and/or when the light source operates in another operational mode. The additional second images of the illuminated environment may be used to determine the effect of the light source 204 on the illuminated environment such that, when a replacement light source and/or replacement light emitter is proposed, the effect of the proposed replacement light source and/or replacement light emitter can be accurately simulated such that a relatively good adapted second image can be obtained. When, for example, an image is taken of the illuminated environment at the moment in time when the light source 204 was switched off, thereby providing a base line image of the environment not illuminated by the light source, and knowing the first and second parameters of the light source 204, then there are methods known in the prior art to estimate/simulate what the effect of the light source 204 on the illuminated environment will be. In a further refinement of the method steps used to simulate the influence of a selected replacement light source and/or a selected replacement light emitter and create an adapted second image, as described in previous paragraphs, the method may further use the base line image of the environment not illuminated by the light source as an offset in the pixel calculations of the red, green and blue sub-images. For example, if the base line image is first subtracted from the second image, for example by pixel-wise subtraction of the decomposed base line RGB sub-images from the decomposed second RGB sub-images, then the adjustment ratio(s) only takes into account the illumination of the light source and the replacement light source and substantially eliminates the contribution of other light sources 218 or daylight in the calculations of the adjustment ratio(s) and the adjusted second image.

Figure 6B:
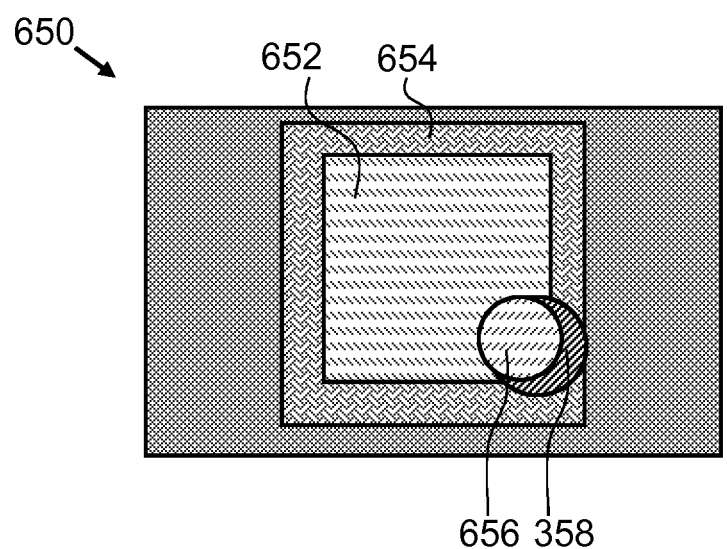

FIG. 6b presents an example of an adapted second image 650 which is the result of the additional stages 550. When, for example, the selected replacement light source and/or selected replacement light emitter emits a different color of light than the light source 204 of FIG. 2, the adapted second image 650 looks differently than the second image 350 of FIG. 3b. The top surface 656 of the object is imaged in a different color, and the footprint of the light beam 652/654 has another color. When, in an example, the selected replacement light source and/or selected replacement light emitter emits a different shaped light beam, the shape of the footprint 652/654 would have been different.

Figure 7:
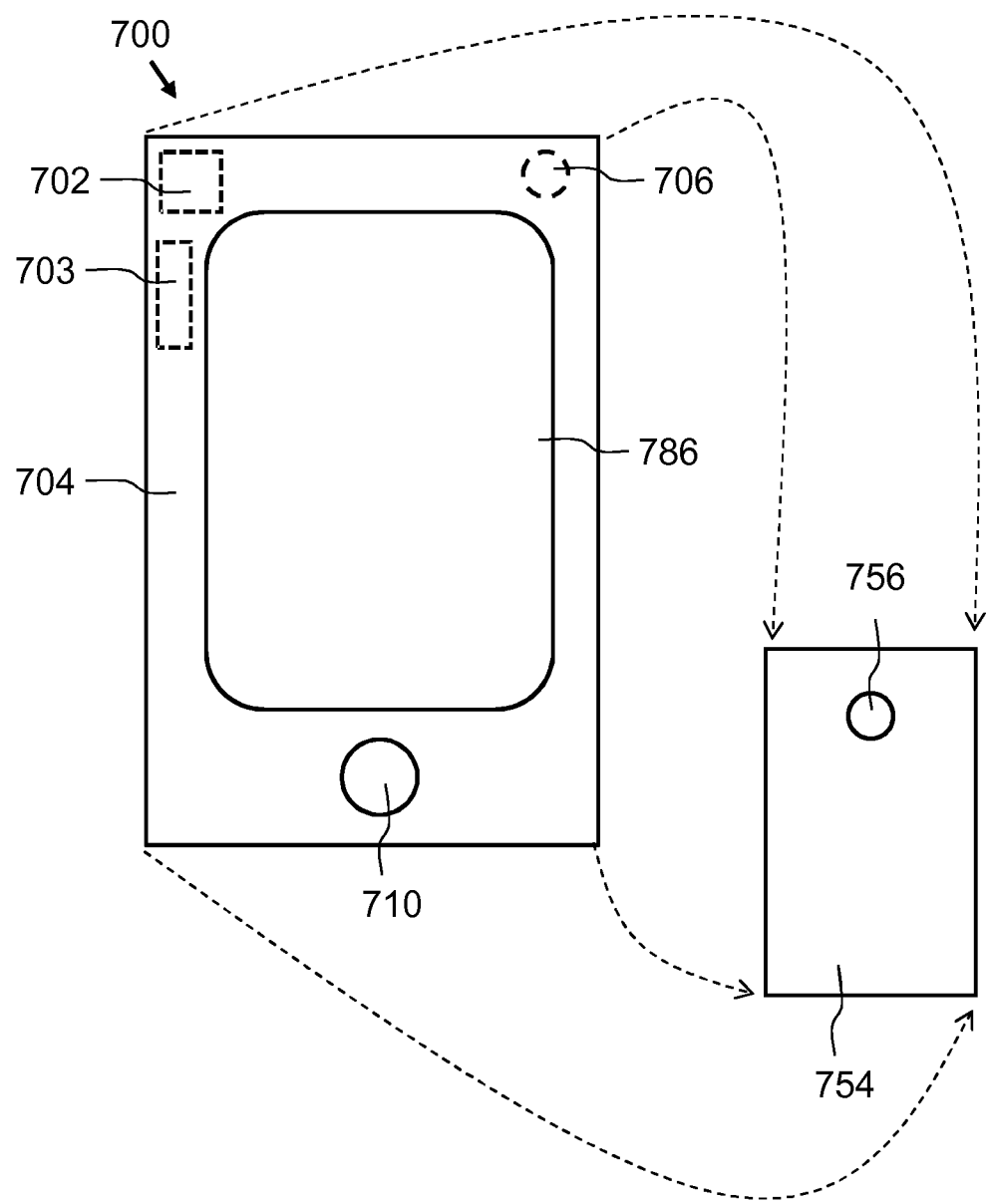

FIG. 7 presents a mobile device 700 according to the second aspect of the invention. The front side 704 is presented at the left and the rear side 754 is presented at the right. The mobile device 700 comprises at least a processing unit 702, a data storage 703 and a first camera 756. The first camera 756 comprises an image processing system (not shown) and an optical system (not shown) of which, during obtaining an image with the first camera, parameters are automatically adjusted by the first camera 756 to obtain a quality image of an imaged object or environment. Such parameters are discussed previously and may include shutter speed, focal distance, aperture size, image sensor sensitivity, color correct, color balance, etc. The data storage 703 stores a computer program comprising computer program code adapted to perform the stages of one of the above discussed embodiments of the method of characterizing a light source according or one of the above discussed embodiments of the method of selecting a replacement light source. The first camera 756 is coupled to the processing unit 702 and the processing unit 702 is coupled to the data storage 703. The processing unit 702 may be adapted to execute the computer program as stored on the data storage 703. The data storage may comprise any data storage medium such as, for example, a hard disk, volatile or non-volatile memory, etc.

The mobile device 700 optionally comprises a second camera 706 which is arranged at the front side 704 of the mobile device 700. The second camera is also coupled to the processing unit 702 and the second camera also comprises an image processing system and an optical system of which, during obtaining an image with the second camera 706, parameters are automatically adjusted by the second camera 706 to obtain a quality image of an imaged object or environment. The second camera 706 obtains images in a second direction which is substantially opposite a first direction in which the first camera 756 obtains images.

The first side 704 of the mobile device 700 optionally comprises a display 786 and an input means 710 for receiving user input. The input means 710 is, for example, a push button, or, for example, a touch pad which registers movements of a finger of a user when the user moves the finger over the input means 710, or a keypad. In another embodiment, the display 786 is constituted by a touch display on which user input may be received.

The mobile device 700 may further comprise a computer program which comprises instructions to instruct a user of the mobile device to obtain the first image of the light source with the first camera. The computer program comprises computer program code, i.e. instructions, for operating the display 786 to instruct the user of the mobile device 700. Optionally, the computer program may further comprise instructions to present the obtained first image on the display 786. Optionally, when the mobile device 700 only comprises one camera (for example only the first camera 756) the computer program comprises instructions to instruct the user to direct the mobile phone in a substantially opposite direction to obtain the second image of the illuminated environment. Optionally, the computer program instructs the processing unit to present the obtained second image on the display 786. Further, when the method that is implemented in the computer program proposes a replacement light source and/or replacement light emitter, the proposal is communicated to the user via the display 786. Optionally, in one embodiment the mobile device 700 comprises an internal database with replacement light source and/or replacement light emitters and in another embodiment, the mobile device 700 comprises a network interface for connecting to a network which is coupled to a database with replacement light source and/or replacement light emitters. In yet another embodiment, the method that is implemented in the computer program that is stored on the mobile device 700 simulates the effect of a proposed replacement light source/light emitter and presents an adapted second image on the display 786.

It is to be noted that the mobile device 700 is just an example of a device which may be configured to perform the method according to the first aspect of the invention. Another type of device, such as a traditional computer with a display and a webcam, may also be capable of performing the method according to the invention when provided with the right program code.

Additional embodiments are discussed hereinafter:

Constant Illumination State Embodiment.

Here a first system comprises of a mobile device incorporating either a single forward facing camera, or both forward facing and rear facing cameras. The mobile device may optionally include a gyroscope, accelerometers and processing means which may be used to provide an Inertial Navigation System (INS) capability. The image sensor(s) and associated processing system incorporates a capability whereby the effective aperture, speed, ISO and other characteristics may be varied. The mobile device is connected—through a wireless connection—either directly or indirectly to a server comprising of a processor, memory and communications interfaces.

A method may be executed on the system as follows (for mobile devices with both forward and rear facing image sensors):

1. User, or another application, selects "Light source replacement mobile device application diagnostic.

2. The user is instructed to image the lamp providing the source of illumination and/or the scene of illumination using the forward facing and rear facing image sensors of the mobile device, 3. The user images the light source and/or scene of illumination, 4. The mobile device analyses the image to check that the probability that a light source is being imaged exceeds a threshold value, 5. The mobile device captures image from both forward and rear facing image sensors, automatically adjusting the aperture, speed, focus and other settings to be consistent with the images being captured. The settings are stored with the images as metadata.

6. Optionally, the image of the illuminated scene is analysed to determine whether there are shadows which may suggest the existence of more than one source of illumination. If shadows exist, then these are further analysed to determine the likely number of light sources. Through an iterative process starting each time from step 2 the user is advised of the number of remaining light sources to be imaged and asked to confirm that the value is correct. This is repeated until all possible light sources have been imaged.

7. The captured image of the light source is analysed by a suitable algorithm to determine the possible likely type, size, power and shape of the light source. For example, it is determined whether the light source is a point (LED, halogen spotlight etc.) or a panel (OLED, fluorescent tube etc.). Further diagnosis is made using the metadata for the image, together with the image data, to determine likely power, technology type, distance from camera etc. These may then be used to filter a list of all possible lamp types to produce a shorted list from which the user may then be invited to select the actual lamp type. The output from step 7 is a set of values which indicates the properties of the lamp. These may include technology type, power, shape etc.

8. This lamp data is then associated with the captured image of the scene, and stored either locally on the mobile device or/and communicated to the server.

9. Using the lamp data from (8), algorithms can be used to simulate the effect of a new lamp (of known attributes) being used to replace the original lamp whose data is captured in 8. A representation of the new scene may be computed based on the characteristics of the new lamp, and this displayed to the user using the display of the mobile device.

Alternatively, in between the above presented steps (5) and (6) the user is guided to take an image of the illuminated scene. This is achieved by using the INS of the mobile device, which guides (through audible, visual, haptic or other interfaces) the user to rotate the device through 180 degrees about an axis. Steps 3 to 5 are then repeated, but with the illuminated scene replacing the source of illumination.

Varying Illumination State Embodiment.

Here the system comprises of a mobile device incorporating either a single forward facing camera, or both forward facing and rear facing cameras. The mobile device may optionally include a gyroscope, accelerometers and processing means which may be used to provide an Inertial Navigation System (INS) capability. The image sensor(s) and associated processing system incorporates a capability whereby the effective aperture, speed, ISO and other characteristics may be varied. The mobile device is connected—through a wireless connection—either directly or indirectly to a server comprising of a processor, memory and communications interfaces. The lamp which is being imaged has a means of control, either through a manual switch or in an automated way through a control system which optionally may have connectivity to the mobile device.

A method may be executed on the system as follows (for mobile devices with both forward and rear facing image sensors):

1. User, or another application, selects "Light source replacement" mobile device application diagnostic,
2. The number of lamp states, n, for the operation is determined.
3. The lamp state is set to State (A+iteration number, e.g. $A_1$, $A_2 \ldots A_n$) by manual or automatic means
4. The user is instructed to image the lamp providing the source of illumination and/or the scene of illumination using the forward facing and rear facing image sensors of the mobile device,
5. The user images the light source and/or scene of illumination,
6. The mobile device analyses the image to check that the probability that a light source is being imaged exceeds a threshold value,
7. The mobile device captures image from both forward and rear facing image sensors, automatically adjusting the aperture, speed and other settings to be consistent with the images being captured. The settings are stored with the images as metadata.
8. Steps 3 through 7 are repeated until each of the lighting states has been captured.
9. Optionally, the images of the illuminated scene are analyzed to determine whether there are shadows which may suggest the existence of more than one source of illumination. If shadows exist, then these are further analyzed to determine the likely number of light sources. Through an iterative process starting each time from step 2 the user is advised of the number of remaining light sources to be imaged and asked to confirm that the value is correct. This is repeated until all possible light sources have been imaged.
10. The captured images of the light source are analyzed by a suitable algorithm to determine the possible likely type, size, power and shape of the light source. For example, it is determined whether the light source is a point (LED, halogen spotlight etc.) or a panel (OLED, fluorescent tube etc.). Further diagnosis are made using the metadata for the image, together with the image data, to determine likely power, technology type etc. These may then be used to filter a list of all possible lamp types to produce a shorted list from which the user may then be invited to select the actual lamp type. The output from step 10 is a set of values which indicate the properties of the lamp. These may include technology type, power, shape etc.
11. This lamp data is then associated with the captured image of the scene, and stored either locally on the mobile device or/and communicated to the server.

Using the lamp data from (11), algorithms can be used to simulate the effect of a new lamp (of known attributes) being used to replace the original lamp whose data is captured in 11. A representation of the new scene may be computed based on the characteristics of the new lamp, and this displayed to the user using the display of the mobile device.

Non mobile device image sensors may also be used in some circumstances. These may, for example, include webcam links which are embedded in a television. In this instance, additional processing and/or different method will be necessary as this will only image from one position.

Other permutations of the previously discussed embodiments are possible, for example with INS and only a single sensor as in the Constant illumination state example.

In summary: A method of and a device for characterizing a light source and a method of selecting a replacement light source are provided. The method obtains a first image of a light source in operation, obtains a second image of the illuminated environment, and obtains first camera settings and second camera settings of the optical system and image processing system of the respective first and second camera at the respective moments in time that the first image and the second image was obtained. The first image, the second image, and the first and second camera settings are analyzed to estimate characteristics of the light source. The characteristics of the light source may be used to propose a replacement light source and characteristics of the proposed replacement light source may be used to simulate the effect of the replacement light source on the illuminated environment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of characterizing a light source, the light source comprising a light emitter for emitting light, the method comprises the stages of
    obtaining a first image of the light source in operation by means of a first camera, the first image is obtained from a first position (P1) in a first direction,
    obtaining first camera settings, wherein the first camera settings represent parameters of an image processing system and of an optical system of the first camera used at the moment in time when the first image was obtained,
    obtaining a second image of an illuminated environment being illuminated by the light source by means of a second camera, the second image is obtained from a second position (P2) in a second direction different from the first direction,
    obtaining second camera settings, wherein the second camera settings represent parameters of an image processing system and of an optical system of the second camera used at the moment in time when the second image was obtained,
    analyzing the first image and analyzing the first camera settings to estimate first parameters of the light source, wherein the first parameters of the light source relate to characteristics of light emitted by the light emitter,
    wherein, in the stage of analyzing the first image and analyzing the first camera settings, the second image and the second camera settings are also analyzed to estimate second parameters of the light source and to more accurately estimate the first parameters of the light source, wherein the second parameters of the light source relate to characteristics of a light beam emitted by the light source, the second parameters comprise information relating to a shape of the light beam.

2. The method according to claim 1, wherein the second camera is the first camera and the method further comprising the stage of repositioning the first camera after obtaining the first image to the second position (P2) in the second direction for obtaining the second image.

3. The method according to claim 1, wherein the second position (P2) is substantially identical to the first position (P1) and wherein the second direction is substantially opposite to the first direction.

4. The method according to claim 1, wherein,
    characteristics of light emitted by the light emitter comprise at least one of: emitted light intensity by the light source, light emission spectrum of the light source, color point of the emitted light, color temperature of the emitted light,
    and, optionally, the first parameters comprise geometrical parameters of the light source, geometrical parameters of the light source comprise at least one of: shape of light emitting surface of the light source, size of the light source, parameters of visible optical elements in the light source, characteristics of the luminaire in which the light source is provided, the characteristics of the luminaire comprise a shape, a size, a mounting and a type of luminaire.

5. The method according to claim 1 further comprising the stage of:
    analyzing the second image to determine whether the illuminated environment is also illuminated by additional light sources, the additional light sources comprising additional light emitters,
    obtaining additional first images of the additional light sources,
    obtaining additional first camera settings, wherein the additional first camera settings represent the parameters of the image processing system and of the optical system of the first camera used at the moment of time when the additional first images were obtained,
    wherein, in the stage of analyzing the first image and analyzing the first camera settings together with the second image and the second camera settings, the additional first images and the additional first camera settings are also analyzed to estimate the influence of the additional light sources on the illuminated environment for more accurately estimating the second parameters and/or first parameters of the light source (204).

6. The method according to claim 1 further comprises the stage of:
    controlling the light source into a second operational mode, wherein the light source is controllable in a first operational mode and the second operational mode, each one of the first operational mode and the second operational mode relates to a specific light emission, the light emission of the first operational mode being different from the light emission of the second operational mode, and wherein the first image is obtained from the light source when the light source was operating in the first operational mode,
    obtaining a further first image of the light source in operation in the second operational mode by means of the first camera,
    obtaining further first camera settings, wherein the further first camera settings represent the parameters of the image processing system and of the optical system of the first camera used at the moment in time when the further first image was obtained,
    analyzing the further first image and analyzing the further first camera settings to estimate further parameters of the light source in relation to the second operational mode, wherein the further parameters of the light source relate to characteristics of light emitted by the light emitter and/or relate to geometrical parameters of the light source.

7. The method according to claim 1, wherein the stages of obtaining the first image, obtaining the additional first images, and/or obtaining the further first image comprise the stages of:
    instructing a user to direct the first camera to, respectively, the light source, the additional light source or the light source operating the second operational mode,
    detecting on basis of information of the image processing system whether the amount of received light exceeds a minimum value,
    obtaining the respective image when the amount of received light exceeds the minimum value.

8. The method according to claim 1, wherein the stage of analyzing the first image and analyzing the first camera settings to estimate the first parameters of the light source comprises the stages of:

comparing the first image with images of light sources stored in a database to find an image of a light source that is similar to the first image, the database also stores together with the images of the light sources information about the parameters of the respective light sources, obtaining the first parameters from the database by obtaining parameters of the light source of the found image that is similar to the first image.

9. The method according to claim 1, wherein the first camera is also configured to image the light source in the infrared spectral range to obtain a heat signature of the light source and the stage of obtaining the first image comprises obtaining a heat signature, and wherein in the stage of analyzing the first image and analyzing the first camera settings to estimate the first parameters of the light source, the heat signature is also analyzed to obtain further characteristics of the light source which relate to the operational conditions of the light source.

10. The method according to claim 1, wherein the first camera and/or the second camera are a hyper spectral camera.

11. A method of selecting a replacement light source, the method comprises the stages of the method of characterizing a light source according to claim 1 and comprises the further stages of:

selecting from a list of replacement light sources and/or replacement light emitters a replacement light source and/or a replacement light emitter, wherein the replacement light source and/or the replacement light emitter have at least one parameter that is similar to one of the first parameters and/or the second parameters of the light source, proposing the selected replacement light source and/or the selected replacement light emitter to a user.

12. The method of selecting a replacement light source according to claim 11 further comprising the stage of:

simulating an influence of the selected replacement light source and/or the selected replacement light emitter on the illuminated environment, creating an adapted second image showing the result of the simulating of the influence of the selected replacement light source and/or the selected replacement light emitter on the environment, presenting the adapted second image to the user.

13. The method of selecting a replacement light source according to claim 11, wherein the selected replacement light source and/or the selected replacement light emitter may operate in a third operational mode and a fourth operational mode, in each one of the third operational mode and the fourth operational mode the selected replacement light source and/or the selected replacement light emitter emits a specific light emission, the light emission of the third operational mode being different from the light emission of the fourth operational mode, and the obtained adapted second image relates to the third operational mode of the selected replacement light source and/or the selected replacement light emitter, the method further comprising the stages of:

simulating an influence of the selected replacement light source and/or the selected replacement light emitter on the environment, the simulating relates to the operation of the selected replacement light source and/or the selected replacement light emitter in the fourth operational mode, creating a further adapted second image showing the result of the simulating of the influence of the selected replacement light source and/or the selected replacement light emitter on the environment, presenting the further adapted second image to the user.

14. A computer-readable, non-transitory medium having stored therein instructions for causing a processing unit to execute a method of characterizing a light source, the light source comprising a light emitter for emitting light, the medium comprising code for:

obtaining a first image of the light source in operation by means of a first camera, the first image is obtained from a first position (P1) in a first direction, obtaining first camera settings, wherein the first camera settings represent parameters of an image processing system and of an optical system of the first camera used at the moment in time when the first image was obtained, obtaining a second image of an illuminated environment being illuminated by the light source by means of a second camera, the second image is obtained from a second position (P2) in a second direction different from the first direction, obtaining second camera settings, wherein the second camera settings represent parameters of an image processing system and of an optical system of the second camera used at the moment in time when the second image was obtained, analyzing the first image and analyzing the first camera settings to estimate first parameters of the light source, wherein the first parameters of the light source relate to characteristics of light emitted by the light emitter, wherein, in the stage of analyzing the first image and analyzing the first camera settings, the second image and the second camera settings are also analyzed to estimate second parameters of the light source and to more accurately estimate the first parameters of the light source, wherein the second parameters of the light source relate to characteristics of a light beam emitted by the light source, the second parameters comprise information relating to a shape of the light beam.

15. A computer-readable, non-transitory medium having stored therein instructions for causing a processing unit to execute a method of selecting a replacement light source, the medium comprises the code of the medium of characterizing a light source according to claim 14, and the medium the further includes code for:

selecting from a list of replacement light sources and/or replacement light emitters a replacement light source and/or a replacement light emitter, wherein the replacement light source and/or the replacement light emitter have at least one parameter that is similar to one of the first parameters and/or the second parameters of the light source, proposing the selected replacement light source and/or the selected replacement light emitter to a user.

* * * * *